United States Patent
Milton et al.

(10) Patent No.: US 10,210,676 B2
(45) Date of Patent: Feb. 19, 2019

(54) SYSTEMS, APPARATUSES, AND METHODS FOR MONITORING PRESSURE IN A HYDRAULIC SYSTEM

(71) Applicant: Caterpillar Inc., Peoria, IL (US)

(72) Inventors: Dale E. Milton, Brimfield, IL (US); Ankitkumar P. Dhorajiya, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 407 days.

(21) Appl. No.: 15/197,281

(22) Filed: Jun. 29, 2016

(65) Prior Publication Data

US 2018/0005462 A1 Jan. 4, 2018

(51) Int. Cl.
  *G07C 5/08* (2006.01)
  *G07C 5/00* (2006.01)
  *B62D 5/06* (2006.01)
  *B60T 13/14* (2006.01)
  *B60T 17/22* (2006.01)
  *B60T 13/66* (2006.01)

(52) U.S. Cl.
  CPC ............ *G07C 5/0808* (2013.01); *B60T 13/14* (2013.01); *B60T 13/662* (2013.01); *B60T 17/221* (2013.01); *B62D 5/06* (2013.01); *G07C 5/006* (2013.01); *B60T 2270/88* (2013.01)

(58) Field of Classification Search
  CPC ....... G07C 5/0808; G07C 5/006; B60T 13/14; B60T 13/662; B60T 17/221; B60T 2270/88; B62D 5/06
  USPC ...................................................... 701/32.1
  See application file for complete search history.

(56) References Cited

U.S. PATENT DOCUMENTS

| | | |
|---|---|---|
| 3,662,333 A | 5/1972 | Howard et al. |
| 6,322,164 B1 * | 11/2001 | Sakamoto ............. B60T 8/3275 303/114.3 |
| 6,389,349 B1 * | 5/2002 | Hachtel ................... B60T 8/404 303/11 |
| 7,430,492 B2 | 9/2008 | Nicolas et al. |
| 8,494,789 B2 | 7/2013 | Boissonneau et al. |
| 8,839,617 B2 | 9/2014 | Nelson et al. |

(Continued)

FOREIGN PATENT DOCUMENTS

| | | |
|---|---|---|
| JP | H6-328224 A | 11/1994 |
| JP | 2009-264455 A | 11/2009 |

(Continued)

*Primary Examiner* — Anne M Antonucci
*Assistant Examiner* — James E Stroud
(74) *Attorney, Agent, or Firm* — Oblon, McClelland, Maier & Neustadt

(57) ABSTRACT

A method, system, and apparatus to determine a malfunction or an abnormal pressure condition in a hydraulic system over a time period are provided. The method, system, and apparatus include monitoring hydraulic accumulator charge time, hydraulic accumulator discharge time, and hydraulic pump pressure over the time period, and determining whether the monitored hydraulic accumulator charge time, hydraulic accumulator discharge time, and hydraulic pump pressure are within respective predetermined ranges. A maintenance notification is output responsive to at least one of the monitored hydraulic accumulator charge time, hydraulic accumulator discharge time, and hydraulic pump pressure being outside the respective predetermined ranges during the time period.

20 Claims, 5 Drawing Sheets

(56) References Cited

U.S. PATENT DOCUMENTS

| | | | |
|---|---|---|---|
| 2001/0006308 A1* | 7/2001 | Kawahata | B60T 8/367 |
| | | | 303/122 |
| 2011/0120122 A1* | 5/2011 | Cagnac | B60T 7/042 |
| | | | 60/579 |
| 2014/0026865 A1 | 1/2014 | Dudar et al. | |
| 2014/0124281 A1* | 5/2014 | Moore | B60K 6/12 |
| | | | 180/165 |
| 2014/0319902 A1* | 10/2014 | Benzler | B60T 13/586 |
| | | | 303/6.01 |
| 2015/0097417 A1* | 4/2015 | Thompson | B60T 13/662 |
| | | | 303/10 |
| 2015/0176250 A1* | 6/2015 | Stutchbury | B60K 17/04 |
| | | | 180/242 |
| 2016/0121947 A1* | 5/2016 | Lyle | E02F 3/325 |
| | | | 180/306 |

FOREIGN PATENT DOCUMENTS

| | | |
|---|---|---|
| JP | 4982422 B2 | 7/2012 |
| WO | WO 2015/156790 A1 | 10/2015 |

* cited by examiner

SYSTEMS, APPARATUSES, AND METHODS FOR MONITORING PRESSURE IN A HYDRAULIC SYSTEM

TECHNICAL FIELD

The present disclosure relates to hydraulic systems, and more particularly to systems, apparatuses, and methods for monitoring pressure in hydraulic systems.

BACKGROUND

Machines, such as off-highway trucks and mining trucks, may employ one or more hydraulic systems to control various operations. For example, a hydraulic braking system can be employed to control driving speed of the machine, and a hydraulic pump can be employed to charge a hydraulic braking accumulator or accumulators of the hydraulic braking system. Similarly, a hydraulic steering system can be employed to steer the machine, and a hydraulic pump can be employed to charge a hydraulic steering accumulator or accumulators of the hydraulic steering system. Since such hydraulic systems operate with fluid, such as Nitrogen for an accumulator and oil for a hydraulic pump, maintenance activities may be carried out on the hydraulic systems to identify whether pressures of the hydraulic system and components thereof, such as an accumulator and a hydraulic pump, are at respective predetermined pressures or within respective predetermined pressure ranges. For example, pressure gauges may be manually connected to the accumulator and the hydraulic pump to detect respective pressures. However, each instance of manual pressure gauge connection can cause loss of pressure. As such, periodic connections of pressure gauges to hydraulic systems, over time, can cause hydraulic pressure characteristics to deviate from acceptable limits.

Japanese Publication Number 2009-264455, hereinafter referred to as the '455 publication, describes detecting an abnormal accumulator gas pressure drop during driving of a hydraulic pump. According to the '455 publication, a gas pressure drop detecting device for an accumulator is provided on a dump truck and includes a pressure sensor to detect the supply or supply stop of pressure oil to the accumulator during the driving of the hydraulic pump. The '455 publication also describes that the gas pressure drop detecting device includes a computing means to compute a determining element of determining an abnormality of gas pressure in the accumulator in accordance with a signal from the pressure sensor, namely, a charge cycle number (X/s) per unit time. A determining means of the gas pressure drop detecting device determines whether the computed charge cycle number (X/s) is considered to represent an abnormal drop, namely, a charge cycle number (Y/s) per unit time, or greater, and an output means outputs an abnormality signal when the determining means determines that the computed charge cycle number (X/s) is greater than or equal to the abnormal drop charge cycle number (Y/s).

SUMMARY OF THE DISCLOSURE

In one aspect of the present disclosure, a mining truck is provided. The mining truck includes a first hydraulic system to drive traction wheels of the mining truck and a second hydraulic system to operate a steering system of the mining truck. The mining truck also includes a third hydraulic system to operate braking components of the mining truck. The third hydraulic system includes a hydraulic brake pump, and a hydraulic brake accumulator in fluid communication with the hydraulic brake pump and the braking components of the mining truck. The third hydraulic system also includes a first sensor to sense pressure characteristics of the hydraulic brake pump and a second sensor to sense pressure characteristics of the hydraulic brake accumulator. The third hydraulic system further includes circuitry electrically coupled to the first sensor and the second sensor. The circuitry is configured to receive a plurality of signals from the first sensor regarding sensed pressure characteristics of the hydraulic brake pump over a predetermined number of brake actuation cycles. The sensed pressure characteristics of the hydraulic brake pump include information regarding a maximum brake pump pressure for each of the brake actuation cycles. The circuitry is further configured to receive a plurality of signals from the second sensor regarding sensed pressure characteristics of the hydraulic brake accumulator over the predetermined number of brake actuation cycles. The sensed pressure characteristics of the hydraulic brake accumulator include information regarding a charge time and a discharge time of the hydraulic brake accumulator for each of the brake actuation cycles. The circuitry is further configured to determine whether the maximum brake pump pressure for each of the brake actuation cycles reaches a predetermined pressure threshold level. Further, the circuitry is configured to record any occurrences of maximum brake pump pressure failing to reach the predetermined pressure threshold level over the predetermined number of brake actuation cycles. The circuitry is also configured to determine whether the charge time of the hydraulic brake accumulator for each of the brake actuation cycles is at or below a predetermined charge time threshold level, and record any occurrences of the charge time of the hydraulic brake accumulator for each of the brake actuation cycles exceeding the predetermined charge time threshold level over the predetermined number of brake actuation cycles. The circuitry is also configured to determine whether the discharge time of the hydraulic brake accumulator for each of the brake actuation cycles is at or above a predetermined discharge time threshold level, and record any occurrences of the discharge time of the hydraulic brake accumulator for each of the brake actuation cycles failing to reach the predetermined discharge time threshold level over the predetermined number of brake actuation cycles. Additionally, the circuitry is configured to determine whether an abnormal brake pressure condition exists over the predetermined number of brake actuation cycles based on a total number of recorded occurrences of the maximum brake pump pressure failing to reach the predetermined pressure threshold level, a total number of occurrences of the charge time of the hydraulic brake accumulator exceeding the predetermined charge time threshold level, and a total number of occurrences of the discharge time of the hydraulic brake accumulator failing to reach the predetermined discharge time threshold level. The circuitry is further configured to cause output of an abnormal brake pressure condition maintenance indication responsive the determining indicating that the abnormal brake pressure condition exists.

In another aspect of the present disclosure, a method of notifying an operator of a determined malfunction of a hydraulic braking system of an industrial machine is provided. The method includes monitoring, using circuitry, brake accumulator pressure charge time, brake accumulator pressure discharge time, and brake pump pressure over a predefined number of brake actuation cycles. The method further includes determining, using the circuitry, whether any of the monitored brake accumulator pressure charge times, brake accumulator pressure discharge times, and brake pump pressures over the predefined number of brake actuation cycles fail to meet respective predetermined threshold conditions. The method further includes determining, using the circuitry, whether at least one of the respective predetermined threshold conditions fails to be met a first predetermined number of times over the predefined number of brake actuation cycles. The method also includes outputting, using the circuitry, a hydraulic braking system malfunction notification to the operator when at least one of the respective predetermined threshold conditions fails to be met the first predetermined number of times over the predefined number of brake actuation cycles.

In yet another aspect of the present disclosure, a non-transitory computer-readable storage medium is provided. The non-transitory computer-readable storage medium stores instructions that, when executed by a computer, cause the computer to perform a method. The method includes monitoring hydraulic accumulator charge time, hydraulic accumulator discharge time, and hydraulic pump pressure over a time period. The method further includes determining whether the monitored hydraulic accumulator charge time is within a first predetermined range during the time period, whether the monitored hydraulic accumulator discharge time is within a second predetermined range, different from the first predetermined range, during the time period, and determining whether the monitored hydraulic pump pressure is within a third predetermined range, different from the first predetermined range and the second predetermined range, during the time period. The method also includes outputting a maintenance notification responsive to at least two of the monitored hydraulic accumulator charge time being outside the first predetermined range during the time period, the monitored hydraulic accumulator discharge time being outside the second predetermined range during the time period, and the monitored hydraulic pump pressure being outside the third predetermined range during the time period.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
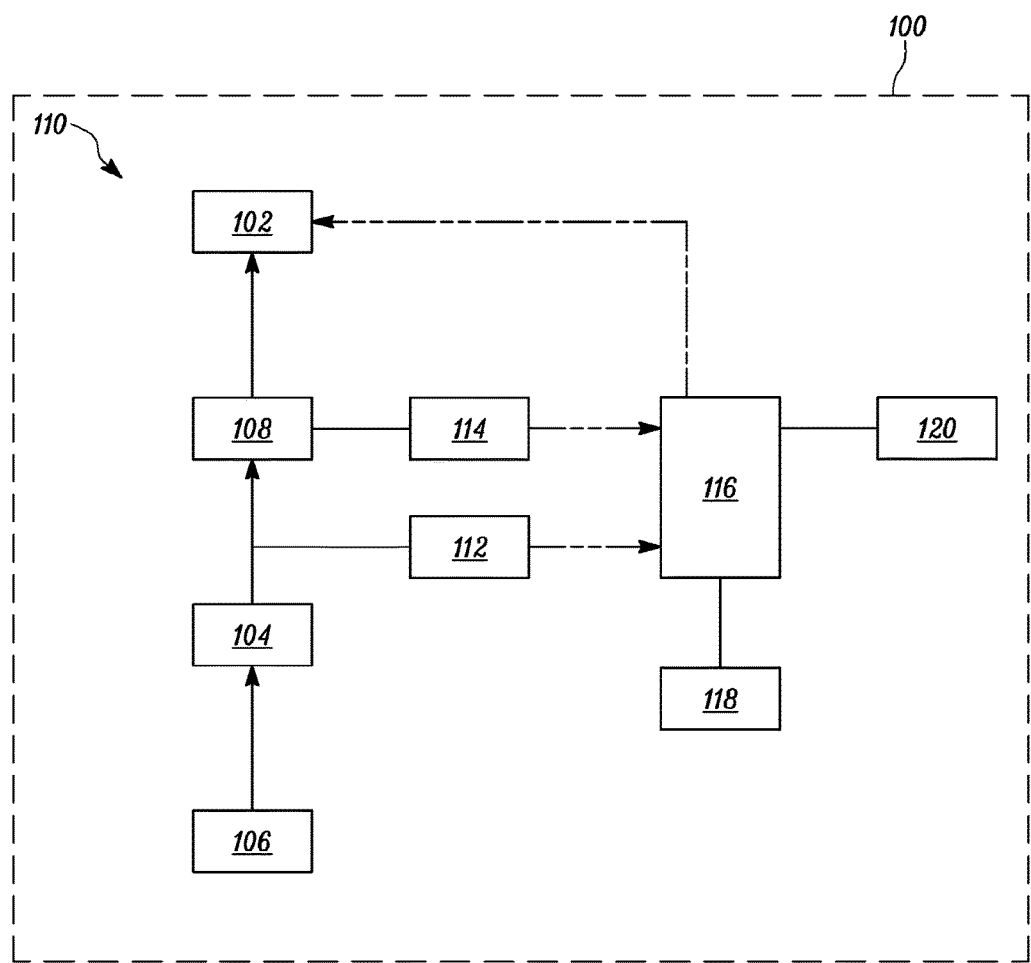
FIG. 1 is a block diagram of a hydraulic system of a machine according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure relate to a system, an apparatus, and a method for monitoring pressure characteristics in one or more hydraulic systems of a machine, particularly an industrial machine, such as a mining truck. More specifically, embodiments of the disclosed subject matter can monitor pressure characteristics pertaining to a hydraulic braking system and/or a hydraulic steering system of the machine to automatically detect an abnormal or fault condition in the hydraulic system or systems. Such automatic monitoring and detection can be performed in consideration of the pressure characteristics over a plurality of cycles, such as a predetermined number of brake actuation cycles. Further, an indication of an abnormal or fault condition in the hydraulic system may be outputted, for instance, to an operator of the machine, to a storage device onboard the machine, and/or a remote maintenance facility.

Referring to FIG. 1, this figure shows a block diagram of a machine 100 comprised of at least one hydraulic system 110. The machine 100 can be an industrial or heavy-duty machine, such as a mining machine. However, the machine 100 may be any type of machine, for example, a machine associated with mining, construction, or other industrial applications, such as backhoe loaders, compactors, industrial loaders, skid steer loaders, wheel loaders, scrapers, dump trucks, etc.

The machine 100 can include a hydraulic braking system 102, a hydraulic brake pump 104 that draws hydraulic fluid, such as oil, from a fluid reservoir or tank 106, and that supplies the hydraulic fluid to the hydraulic braking system 102 via a hydraulic brake accumulator 108, hereinafter referred to as 'the accumulator 108.'

Generally speaking, the accumulator 108 may be understood as a device in a hydraulic system 110 of the machine 100 to store and release energy, in the form of hydraulic pressure, and, optionally, to smooth any pulsation that may be generated in the hydraulic system 110. In particular, the accumulator 108 may reduce shocks caused by rapid operation, or sudden start and stopping, of various components in machine 100, and particularly in the hydraulic system 110. For example, the accumulator 108 may be one of a weight-loaded piston accumulator, a spring accumulator, a diaphragm or bladder accumulator, a hydro-pneumatic piston accumulator, and a gas pre-charged hydraulic accumulator. The accumulator 108 may operate to or assist in storing the hydraulic fluid at a predetermined pressure and dispensing the stored hydraulic fluid at a required pressure to overcome the pressure drop in the hydraulic system 110, thereby maintaining a desired pressure in the hydraulic system 110. Although FIG. 1 illustrates a single accumulator 108, the hydraulic system 110 according to one or more embodiments of the disclosed subject matter may include multiple accumulators.

In an embodiment, the accumulator 108 can include two chambers, where one chamber is configured to store compressible fluid, such as Nitrogen, and the other chamber is configured to receive and store the hydraulic fluid, such as oil. The process of receiving the hydraulic fluid within the chamber can be referred to as charging of the accumulator 108. Such charging may be based on pre-determined cut-in pressure, which may define or be defined as a lower threshold pressure of the accumulator 108. The lower threshold pressure may be understood as a minimum pressure at which the accumulator 108 selectively receives the hydraulic fluid from the hydraulic brake pump 104. Further, charging the accumulator 108 can be ceased based on pressure reaching a pre-determined cutout pressure, which may define or be defined as an upper threshold pressure of the accumulator 108. The upper threshold pressure may be understood as a maximum pressure beyond which the accumulator 108 ceases to receive further hydraulic fluid from the hydraulic brake pump 104.

During braking of the machine 100, the accumulator 108 may cause supply of the hydraulic fluid to the hydraulic braking system 102 to actuate braking components of the hydraulic braking system 102.

The hydraulic system 110 can also include one or more sensors, such as a first sensor 112 and/or a second sensor 114. The first sensor 112 can be disposed at an outlet of the hydraulic brake pump 104 to sense pressure characteristics of the hydraulic brake pump 104, such as pressure of the hydraulic fluid supplied by the hydraulic brake pump 104. The second sensor 114 can be disposed in communication with the accumulator 108 to sense pressure characteristics of the accumulator 108. In an example, the first sensor 112 and/or the second sensor 114 may be a pressure transducer or an inductive type Linear Variable Displacement Transducer (LVDT) in case of spring and piston type accumulator.

The first sensor 112 and the second sensor 114 are electrically coupled to circuitry 116, which may include or be a controller, control circuitry, a control module, an Electronic Control Unit (ECU), an Electronic Control Module (ECM), a processor, processing circuitry, or a combination thereof, for instance. The circuitry 116 is hereinafter referred to as a controller 116. It will be understood that the controller 116 can include one or more circuit or circuitry portions configured to receive inputs from the first sensor 112 and the second sensor 114, and process the received inputs.

In an example, the controller 116 may be a processor that includes a single processing unit or module or a number of processing units or modules, all of which include multiple computing units. In this regard, the explicit use of the term 'processor' should not be construed to refer exclusively to hardware capable of executing a software application. Rather, in this example, the controller 116 may be implemented as one or more microprocessors, microcomputers, digital signal processors, central processing units, state machines, logic circuits, and/or any device that is capable of manipulating signals based on operational instructions. In another example, the controller 116 may be an ECM or ECU the machine 100, as noted above. Among the capabilities mentioned herein, the controller 116 may also be configured to receive, transmit, and execute computer-readable instructions. Further, a data repository or memory 118 can be communicably coupled to the controller 116 to receive and store one or more of data and instructions capable of being processed by the controller 116. Though illustrated in FIG. 1 as separate from the controller 116, the memory 118 additionally or alternatively may be integral to the controller 116.

Furthermore, the controller 116 can be communicably coupled to an interface 120 of the machine 100. The interface 120 can be a dashboard panel, for instance, in an operator's cabin. The interface 120 may also be implemented as a display screen capable of displaying notifications to an operator of the machine 100. In some embodiments, the interface 120 can be a remote monitoring system configured to monitor and/or control operations of the machine 100 from a remote location.

Figure 2:
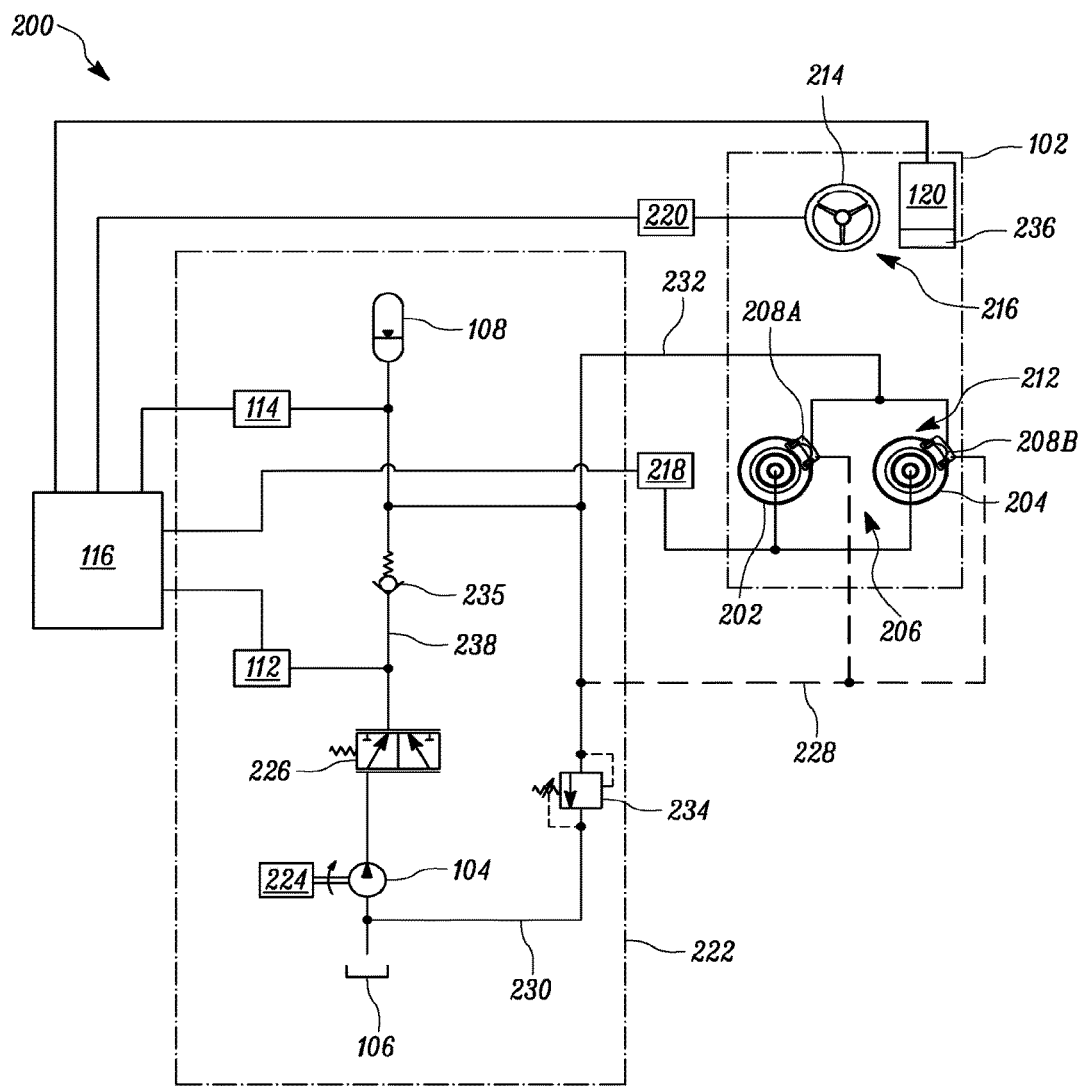
FIG. 2 is a schematic diagram of an electro-hydraulic circuit of the hydraulic system of FIG. 1, according to one or more embodiments of the present disclosure.

FIG. 2 shows a schematic diagram of an electro-hydraulic circuit 200 of the hydraulic system 110 of FIG. 1.

The machine 100 can include a left traction wheel 202 and a right traction wheel 204, hereinafter commonly referred to as the traction wheels 206, which may be rear traction wheels or front traction wheels. The machine 100 may also include another set of one or more traction wheels, which may be the other of rear traction wheels and front traction wheels.

Each traction wheel 206 may be provided with a brake to control movement of the traction wheel 206. For instance, a first brake 208A is coupled to the left traction wheel 202, and a second brake 208B is coupled to the right traction wheel 204. Further, the terminology 'the brakes,' as used herein, may refer to all of the brakes collectively, a set of brakes (e.g., front brakes or rear brakes), or a single brake. In an example, each of the first brake 208A, the second brake 208B, and any brakes of another set of one or more traction wheels can embody disc brakes or drum brakes. The brakes can be accompanied by brake valves (not shown) that control flow of hydraulic fluid to activate or deactivate the brakes. The brakes, the brake valves, and other auxiliary components that aid in operation of the brakes can constitute and may be referred to herein in whole or in part as braking components 212.

The machine 100 may also include a steering wheel 214 operably coupled to the traction wheels 206 through one or more mechanical linkages (not shown), which can control steering of the machine 100. The steering wheel 214 and the mechanical linkages connecting the steering wheel 214 to the traction wheels 206 can constitute a steering system 216.

The machine 100 may also include a first hydraulic system 218 to drive the traction wheels 206 and a second hydraulic system 220 to operate the steering system 216 of the machine 100. Optionally, multiple hydraulic pumps and multiple tanks may be provided in the hydraulic system 110, without departing from the scope of this disclosure, to aid in the operation of the first hydraulic system 218 and the second hydraulic system 220. For example, each of the first hydraulic system 218 and the second hydraulic system 220 may have respective one or more hydraulic pumps, reservoirs, and accumulators. In the illustrated embodiment, a third hydraulic system 222 is provided to operate braking components 212 of the machine 100.

The first hydraulic system 218, the second hydraulic system 220, and the third hydraulic system 222 can be subsidiary systems of the hydraulic system 110 of the machine 100, or, alternatively, the third hydraulic system 222 can be represented partially or fully by the hydraulic system 110.

The third hydraulic system 222, which, generally speaking, can be a hydraulic braking system, can include the hydraulic brake pump 104, and the accumulator 108 in fluid communication with the hydraulic brake pump 104 and the braking components 212 of the machine 100. Optionally, some or all of the braking components 212 may be considered part of the third hydraulic system 222. As noted above, the hydraulic brake pump 104 is in fluid communication with the tank 106, the braking components 212, and the accumulator 108. In some embodiments, the hydraulic brake pump 104 may be coupled to a rotational output from an engine 224 of the machine 100, for example, by a counter shaft, a belt, an electric circuit, or in any other suitable manner. Alternatively, the hydraulic brake pump 104 may be indirectly connected to the engine 224 by a torque converter, a reduction gearbox, or in any other suitable manner.

As mentioned earlier, the hydraulic brake pump 104 is configured to pressurize hydraulic fluid drawn from the tank 106, and direct the pressurized hydraulic fluid to the accumulator 108 and the braking components 212, for instance, via a priority valve 226. In some embodiments, the hydraulic brake pump 104 may embody a fixed displacement pump configured to produce a flow of pressurized hydraulic fluid proportional to a rotational input speed. The function of the priority valve 226 is to allow flow of the pressurized hydraulic fluid from the hydraulic brake pump 104 to downstream components when pressure demand in such downstream components is greater than or equal to a specified level.

The first sensor 112 disposed at the outlet of the hydraulic brake pump 104, for instance, downstream of the hydraulic brake pump 104, and the second sensor 114, which may be disposed upstream of the accumulator 108, can also form a part of the third hydraulic system 222. In addition, the first sensor 112 and the second sensor 114 can be electrically coupled to the controller 116. Thus, optionally, the controller 116 may be considered part of the third hydraulic system 222.

In operation, the controller 116 can receive a plurality of signals from the first sensor 112 regarding sensed pressure characteristics of the hydraulic brake pump 104. The plurality of signals can be received continuously, substantially continuously, or at predefined intervals or sample times over a plurality of cycles, for instance, brake actuation cycles. The braking components 212 may include a brake pedal (not shown) provided in the operator's cabin and a master cylinder (not shown) coupled to the brake pedal and configured to store hydraulic fluid received from the accumulator 108. Upon actuation of the brake pedal, a piston arrangement in the master cylinder can cause the hydraulic fluid to be forced towards the braking components 212 to operate the brakes, for instance, to slow down or stop the machine 100. During such braking operation, the master cylinder can be drained and subsequently filled with hydraulic fluid supplied by the hydraulic brake pump 104. The hydraulic fluid spent at the brakes may be routed to the tank 106 via a return line 228 and a drain line 230. The actuation of the brake pedal, supply of hydraulic fluid by the master cylinder to the brakes, charging of the master cylinder with the hydraulic fluid, and discharging of the accumulator 108 can constitute a brake actuation cycle. Alternatively, the additional subsequent charging of the accumulator 108 can constitute a brake actuation cycle. Alternatively, time periods as described herein, such as predetermined time periods, may be based on times of hydraulic brake accumulator cycles, that is, from a discharge thereof to a charge thereof. Further, to be clear, the time between cycles (brake actuation or hydraulic brake accumulator) may be regular or irregular, depending upon the timing of braking system actuation.

For a subsequent brake actuation cycle, the master cylinder may need to be charged in a minimum possible time or time range so that a subsequent braking can be satisfactorily performed, or, additionally or alternatively, the hydraulic brake pump 104 may need to otherwise cause hydraulic pressure at an output thereof that is at or above a predetermined pressure threshold. Accordingly, the hydraulic brake pump 104 may supply hydraulic fluid with high pressure in an effort to cause hydraulic pressure at the output thereof that is at or above the predetermined pressure threshold. Optionally, the predetermined pressure threshold level can be determined based on the level of hydraulic pressure achieved at the output of the hydraulic brake pump 104 for the minimum possible time for charging of the master cylinder. Additionally or alternatively, the predetermined pressure threshold level may be set based on a minimum amount of pressure to satisfactorily operate the braking components 212 to operate the brakes. Thus, a sensed pressure characteristic of the hydraulic brake pump 104 can include information regarding whether a maximum brake pump pressure for each of the brake actuation cycles is at or above the predetermined pressure threshold. The controller 116 is further configured to determine whether the maximum brake pump pressure for each of the brake actuation cycles reaches the predetermined pressure threshold.

Figure 3:
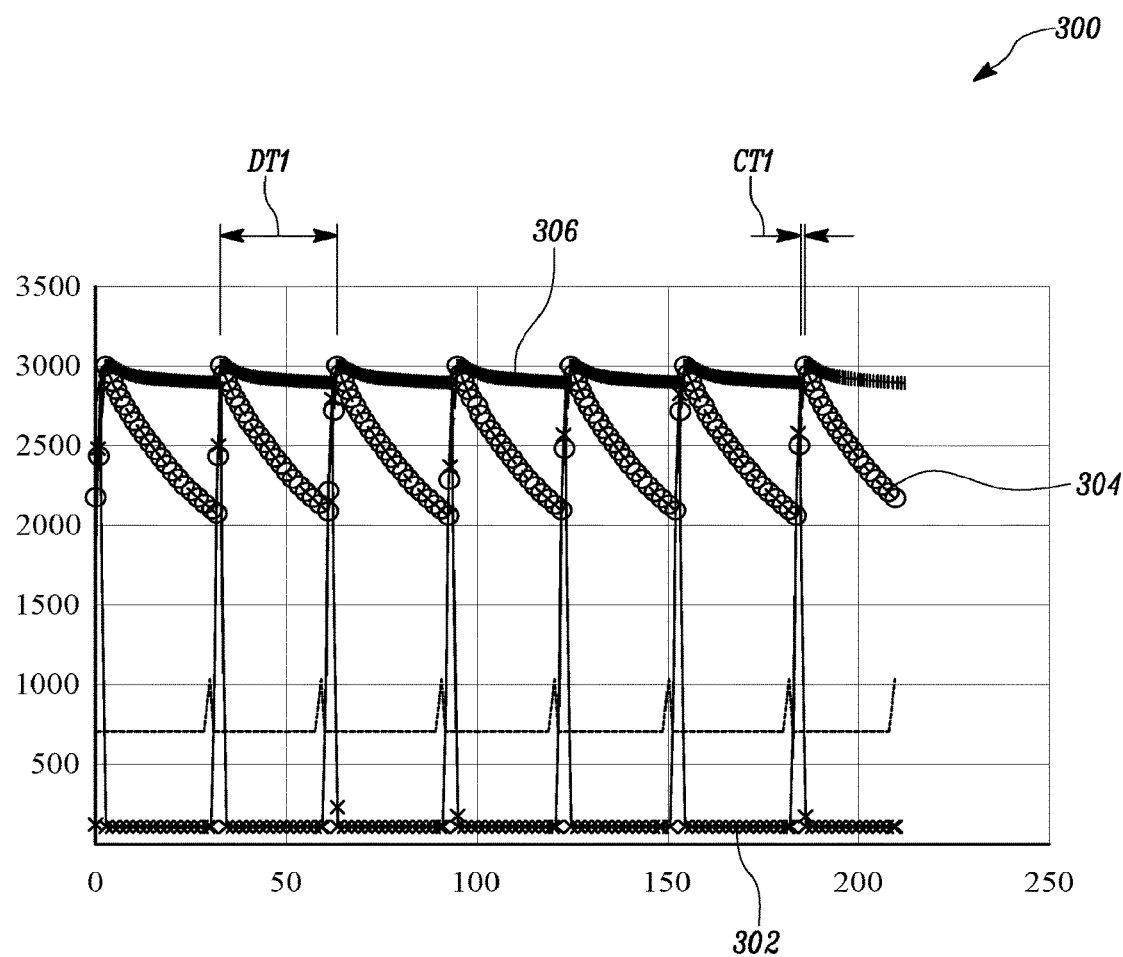
FIG. 3 is a graph of pressure versus time showing different measured or sensed pressure characteristics of a hydraulic braking system over a plurality of cycles, according to one or more embodiments of the present disclosure.
Figure 4:
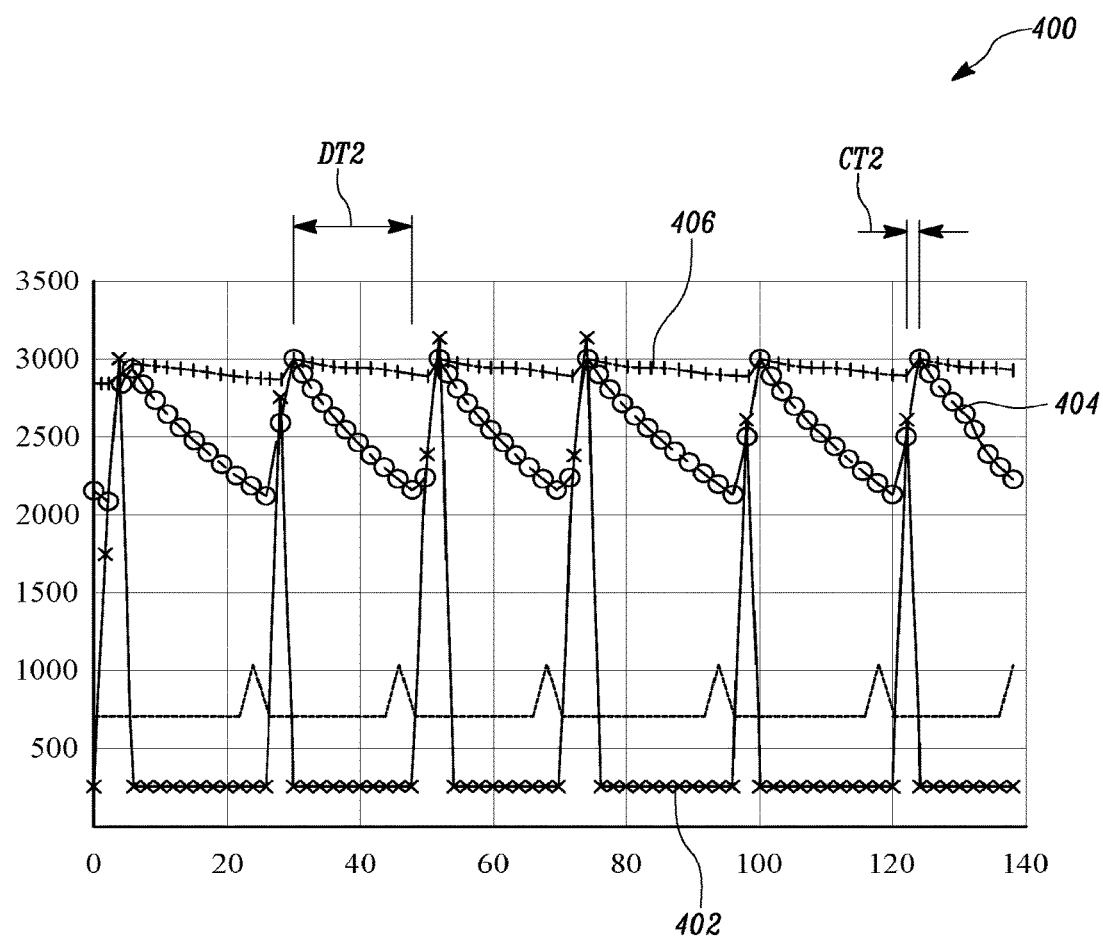
FIG. 4 is a graph of pressure versus time showing different measured or sensed pressure characteristics of a hydraulic braking system over a plurality of cycles that may represent an abnormal or fault condition in the hydraulic braking system, according to one or more embodiments of the present disclosure.

In an example, such as illustrated in FIGS. 3 and 4, the predetermined pressure threshold can be 3000 psi, and, accordingly, the controller 116 can determine whether the maximum brake pump pressure for each of the brake actuation cycles reaches at least 3000 psi. Any instance of the maximum brake pump pressure failing to reach the predetermined pressure threshold level may indicate either that the charging of the master cylinder took more time than allotted to reach the predetermined pressure threshold, or that the pressure at the output of the hydraulic brake pump 104 has otherwise not reached the predetermined pressure threshold, regardless of the time. The controller 116 can record occurrence of each instance when the maximum brake pump pressure fails to reach the predetermined pressure threshold over a predetermined number of cycles, for instance, a predetermined number of brake actuation cycles. In this regard, a predefined number of occurrences over the predetermined number of brake actuation cycles can be indicative of an abnormal or fault condition of the hydraulic braking system 102, for instance, with the hydraulic brake pump 104, control circuitry thereof, or fluid circuitry or components downstream thereof. Optionally, the predefined number of occurrences may be required to be a predetermined number of successive occurrences.

The accumulator 108 can cause supply of hydraulic fluid to provide or supplement the pressure requirement in the third hydraulic system 222, for instance, when the hydraulic brake pump 104 is unable to supply all or a portion of the hydraulic fluid due to low engine speeds. Specifically, the accumulator 108 can supply hydraulic fluid stored therein to the braking components 212 in case of pressure drop in supply line 232 towards the braking components 212. Any extra hydraulic fluid supplied by the accumulator 108 to the braking components 212 to control the brakes can be relieved through a relief valve 234 and further to the tank 106 via the drain line 230. Such supply of the hydraulic fluid by the accumulator 108 can be referred to as discharging of the accumulator 108. A check valve 235 provided downstream of the pump 104, along a flow line 238, can prevent hydraulic fluid from being routed toward the pump 104.

During charging and discharging of the accumulator 108, the controller 116 can receive a plurality of signals from the second sensor 114 regarding sensed pressure characteristics of the accumulator 108 over a plurality of brake actuation cycles. The plurality of signals can be received continuously, substantially continuously, or at predefined intervals or sample times over the plurality of brake actuation cycles. In one or more embodiments, the sensed pressure characteristics of the accumulator 108 can include information regarding charge time and/or discharge time of the accumulator 108 for each of the brake actuation cycles.

As an example, in a case of a piston accumulator, the second sensor 114 may be coupled to the piston, so that movement of the piston can be considered to sense the charge time and the discharge time of the accumulator 108. That is, movement of the piston from a first predetermined position to a second predetermined position within a cylinder of the piston accumulator can be considered as charging of the accumulator 108. Similarly, movement of the piston from the second predetermined position to the first predetermined position within the cylinder of the piston accumulator can be considered discharging of the accumulator 108. During these piston movements the hydraulic fluid is filled and vacated from the cylinder, respectively. Thus, the second sensor 114 may be configured to sense the charge time and the discharge time of the piston accumulator. Alternatively one sensor may be used to sense the charge time and another sensor used to sense the discharge time. Of course, embodiments of the disclosed subject matter can employ accumulators other than the so-called piston accumulator discussed above as a non-limiting example.

Under predefined acceptable braking system operating conditions (i.e., when the hydraulic braking system 102 is operating such that some or all the brake accumulator charge and discharge times, brake pump pressure and optionally accumulator cutout pressure are within predefined limits), the accumulator 108 may need to be charged for an amount of time no longer than a predetermined charge time period or charge time period range, such as less than 8 seconds or less than 10 seconds. Accordingly, in one or more embodiments of the disclosed subject matter, a predetermined charge time threshold level can be determined for comparison against an actual accumulator charging time for the accumulator 108 for each brake actuation cycle. In one or more embodiments, the predetermined charge time threshold level may be a maximum allotted time to fully charge the accumulator 108 with hydraulic fluid for a subsequent discharge. Any occurrence of the charge time exceeding the predetermined charge time threshold level can indicate a lag or delay in the charging of the accumulator 108. Such instances of lag or delay may lead to ineffective braking of the machine 100.

In an example, the predetermined charge time threshold level can be from 8 seconds to 10 seconds. Further, a single occurrence of the charge time exceeding the predetermined charge time threshold level can be indicative of an abnormal or faulty brake pressure condition. Alternatively, multiple occurrences of the charge time exceeding the predetermined charge time threshold level can be indicative of an abnormal or faulty brake pressure condition. For example, a predetermined number of occurrences in a certain time period (e.g., a predetermined number of brake actuation cycles) can signify an abnormal or faulty brake pressure condition. Optionally, the predetermined number may be a predetermined number of successive occurrences. Further, one or more occurrences of the charge time exceeding the predetermined charge time threshold level in combination with one or more other detected pressure characteristics failing to meet respective predetermined thresholds can signify an abnormal or faulty brake pressure condition.

Similarly, under predefined acceptable braking system operating conditions (i.e., when the hydraulic braking system 102 is operating such that some or all the brake accumulator charge and discharge times, brake pump pressure and optionally accumulator cutout pressure are within predefined limits), the accumulator 108 may need to be discharged for an amount of time no faster than a predetermined discharge time period or discharge time period range, such as greater than 25 seconds or between 25 to 40 seconds. Accordingly, according to one or more embodiments of the disclosed subject matter, a predetermined discharge time threshold level can be compared against an actual accumulator discharging time for the accumulator 108 for each brake actuation cycle. In one or more embodiments, the predetermined discharge time threshold level may be a minimum allotted time required to effectuate controlled braking of the braking system for a predefined time period based on the discharging of hydraulic fluid from the accumulator 108 to a preset level corresponding to the predefined time period. Any occurrence of the discharge time failing to reach the predetermined discharge time threshold level can indicate a slower than acceptable discharge time of the accumulator 108. Such instances of slow discharge time may lead to ineffective braking of the machine 100.

In an example, the predetermined discharge time threshold level can be from 25 seconds to 40 seconds. Further, a single occurrence of the discharge time failing to meet the predetermined discharge time threshold level can be indicative of an abnormal or faulty brake pressure condition. Alternatively, multiple occurrences of the discharge time failing to meet the predetermined discharge time threshold level can be indicative of an abnormal or faulty brake pressure condition. For example, a predetermined number of occurrences in a certain time period (e.g., a predetermined number of brake actuation cycles) can signify an abnormal or faulty brake pressure condition. Optionally, the predetermined number may be a predetermined number of successive occurrences. Similar to above, one or more occurrences of the discharge time failing to meet the predetermined discharge time threshold level in combination with one or more other detected pressure characteristics failing to meet respective predetermined thresholds can signify an abnormal or faulty brake pressure condition.

Based on the plurality of signals received from the second sensor 114, the controller 116 can determine whether the charge time of the accumulator 108 for each brake actuation cycle is at or below the predetermined charge time threshold level. Based on the determination, the controller 116 can record any occurrences of the charge time of the accumulator 108 exceeding the predetermined charge time threshold level, for instance, over a predetermined number of brake actuation cycles. Additionally or alternatively, the controller 116 can determine whether the discharge time of the accumulator 108 for each brake actuation cycle is below the predetermined discharge time threshold level, which may be defined as a predetermined discharge time range. Based on the determination, the controller 116 can record any occurrences of the discharge time of the accumulator 108 failing to reach the predetermined discharge time threshold level, for instance, over a predetermined number of brake actuation cycles. Optionally, the predetermined number of brake actuation cycles for monitoring the discharge times of the accumulator 108 is the same as the predetermined number of brake actuation cycles for monitoring the charge times of the accumulator 108.

In one embodiment, the controller 116 can determine a total number of recorded occurrences of maximum brake pump pressure failing to reach the predetermined pressure threshold level, a total number of occurrences of charge time of the accumulator 108 exceeding the predetermined charge time threshold level, and/or a total number of occurrences of discharge time of the accumulator 108 failing to reach the predetermined discharge time threshold level. Each, two or three of the aforementioned total numbers of occurrences can be considered as a total number of occurrences and can be stored in the memory 118.

The controller 116 can determine whether an abnormal brake pressure condition exists over the predetermined number of brake actuation cycles based on the total number of occurrences, each of which may be successive occurrences. When the controller 116 determines that the abnormal brake pressure condition exists, the controller 116 can cause output of an abnormal brake pressure condition maintenance indication. In an example, the abnormal brake pressure condition maintenance indication may be a notification to the operator in the form of a visual notification and/or an audio notification through the interface 120, which may be in an operator's cabin. In some embodiments, the machine 100 may include a notification panel 236 to provide abnormal brake one or more pressure condition notifications and other notifications to the operator. The notification panel 236 may be a dedicated instrument panel to provide notifications regarding various operations of the machine 100, while the interface 120 can be configured to accept inputs from the operator to control operations of the machine 100. In an example, the interface 120 may include a touch-screen or buttons to receive the inputs from the operator.

In one embodiment, the sensed pressure characteristics of the accumulator 108 can include information regarding accumulator cutout pressure, such as whether sensed or monitored accumulator cutout pressure is outside a predetermined cutout pressure threshold or threshold range. In such cases, the controller 116 can determine whether the accumulator cutout pressure is out-of-tolerance for each of the brake actuation cycles over a predetermined number of brake actuation cycles, for instance. Tolerance for the cutout pressure may be a maximum pressure beyond which the accumulator 108 ceases to receive oil from the hydraulic brake pump 104. Based on the determination, the controller 116 can record occurrence of each instance where the accumulator cutout pressure is out-of-tolerance over the predetermined number of brake actuation cycles. Further, the controller 116 can determine whether the abnormal brake pressure condition exists over the predetermined number of brake actuation cycles based on a total number of occurrences of cutout pressure being out-of-tolerance. Thus, one embodiment, the controller 116 can determine a total number of recorded occurrences of maximum brake pump pressure failing to reach the predetermined pressure threshold level, a total number of occurrences of charge time of the accumulator 108 exceeding the predetermined charge time threshold level, a total number of occurrences of discharge time of the accumulator 108 failing to reach the predetermined discharge time threshold level and/or a total number of times the accumulator cutout pressure is outside the predetermined cutout pressure threshold or threshold range. Each, two, three or four of the aforementioned total numbers of occurrences can be considered as a total number of occurrences and can be stored in the memory 118.

As a remedial action in response to identification of an abnormal brake pressure condition, in some embodiments, the controller 116 can supply a predetermined amount of additional power to one or more of the accumulator 108 and the hydraulic brake pump 104 to place the third hydraulic system 222 in an emergency hydraulic mode. For instance, an additional motor (not shown) may be employed in the third hydraulic system 222, and the motor may be selectively coupled to the hydraulic brake pump 104. In case of low engine speeds and abnormal brake pressure condition, the controller 116 may actuate the coupling between the motor and the hydraulic brake pump 104, thereby enabling a required amount of hydraulic fluid to be supplied from the tank 106 to the accumulator 108 and the braking components 212 to operate the brakes.

In another embodiment, the controller 116 can automatically disable the first hydraulic system 218 that drives the traction wheels 206 of the machine 100 when it is determined that the abnormal brake pressure condition exists. For instance, the controller 116 can stop transmission of power between the engine 224 and a transmission shaft (not shown) of the machine 100, thereby ceasing movement of the machine 100, when it is determined that the abnormal brake pressure condition exists. In yet another embodiment, the controller 116 can cause wireless transmission of the abnormal brake pressure condition maintenance indication to circuitry located remotely from the machine 100. In an example, the circuitry located remotely from the machine 100 may be a controller-transceiver combination, where the transceiver receives signals from the controller 116 of the machine 100 and for remote control operation of the machine 100.

FIGS. 3 and 4 show graphs of pressure versus time showing different measured or sensed pressure characteristics data of a hydraulic braking system over a plurality of brake actuation cycles, where FIG. 4 may represent measured or sensed pressure characteristics data corresponding to an abnormal or fault condition in the hydraulic braking system. Optionally, data corresponding to the graphs of FIGS. 3 and 4 may be generated when the machine 100 is idling.

In particular, FIG. 3 illustrates a graph 300 of pressure versus time showing different measured or sensed pressure characteristics data of a hydraulic braking system over a plurality of brake actuation cycles, where horizontal axis represents time in seconds and the vertical axis represents pressure in pounds-per-square-inch (psi). Generally speaking, FIG. 3 can represent a monitored state of the hydraulic braking system 102 representative of acceptable braking system operating conditions (i.e., when the hydraulic braking system 102 is operating such that some or all the brake accumulator charge and discharge times, brake pump pressure and optionally accumulator cutout pressure are within predefined limits).

Graph plot 302 represents hydraulic brake pump pressure monitored for a predetermined time interval, graph plot 304 represents brake accumulator pressure monitored for the predetermined time interval, and graph plot 306 represents brake accumulator cutout pressure monitored for the predetermined time interval. As noted above, the predetermined time interval can include a plurality of brake actuation cycles. Distance between two consecutive peaks of the graph plot 302, that is consecutive peaks of the brake pump pressure, for instance, can represent discharge times of the accumulator 108. Thus, a discharge time of the accumulator 108 can be represented by 'DT1' in the graph 300. Of course, discharge times may vary for the different brake actuation cycles, even for a monitored state of the hydraulic braking system 102 corresponding to acceptable braking system operating conditions. Alternatively, distance in time between a peak and an adjacent subsequent trough of the graph plot 304 can represent discharge time of the accumulator 108.

Similarly, the distance between peak points of the graph plot 302 and the graph plot 306, for instance, can represent charging times of the accumulator 108. Thus, the charging time of the accumulator can be represented by 'CT1' in the graph 300. Of course, charge times may vary for the different brake actuation cycles, even for a monitored state of the hydraulic braking system 102 corresponding to acceptable braking system operating conditions. Alternatively, distance in time between a trough of the graph plot 304 and an adjacent subsequent peak of the graph plot 304 can represent charge time of the accumulator 108.

As is evident from the graph 300, the brake pump pressure has reached the predetermined pressure threshold level of 3000 psi over the predetermined time interval, the discharge time 'DT1' is from 26 seconds to 29 seconds depending upon the brake actuation cycle, each of which is within the predetermined discharge time threshold level of 25 seconds to 40 seconds, and the charge time 'CT1' is 3 seconds, which is below the predetermined charge time threshold level of 8 seconds to 10 seconds. Therefore, graph 300 illustrates an example of the hydraulic braking system 102 operating under acceptable braking system operating conditions.

FIG. 4 illustrates a graph 400 of pressure versus time showing different measured or sensed pressure characteristics data of a hydraulic braking system over a plurality of brake actuation cycles, where horizontal axis represents time in seconds and the vertical axis represents pressure in pounds-per-square-inch (psi). Generally speaking, FIG. 4 can represent a monitored state of the hydraulic braking system 102 representative of unacceptable braking system operating conditions (i.e., when the hydraulic braking system 102 is operating such that some or all the brake accumulator charge and discharge times, brake pump pressure and optionally accumulator cutout pressure are not within predefined limits). Graph plot 402 represents hydraulic brake pump pressure monitored for a predetermined time interval, graph plot 404 represents brake accumulator pressure monitored for the predetermined time interval, and graph plot 406 represents brake accumulator cutout pressure monitored for the predetermined time interval.

From the graph 400, it can be observed that brake pump pressure fails to meet the predetermined pressure threshold level of 3000 psi on a number of occasions over the predetermined time interval, or over the predetermined number of brake actuation cycles. In addition, the discharge time (represented by 'DT2') is between 16 seconds to 20 seconds, depending upon the brake actuation cycle, each of which is below the predetermined discharge time threshold level of 25 seconds to 40 seconds, which i can indicate that the discharge time 'DT2' fails to meet the predetermined discharge time threshold level. It is also noted that the charge times, such as charge time 'CT2,' are 4 seconds or six seconds, which is below the predetermined charge time threshold level of 8 seconds to 10 seconds and is not out-of-tolerances. Nevertheless, the aforementioned brake pump pressure readings and/or the discharge time readings can signify an unacceptable braking system operating condition. Further, such instances of low discharge time may also indicate more leakage than acceptable. Responsive to such conditions, the controller 116 can provide a notification to the operator of the machine 100, disable the first hydraulic system 218 of the machine 100, and/or transmit signals to the remote location for controlling the machine 100.

Figure 5:
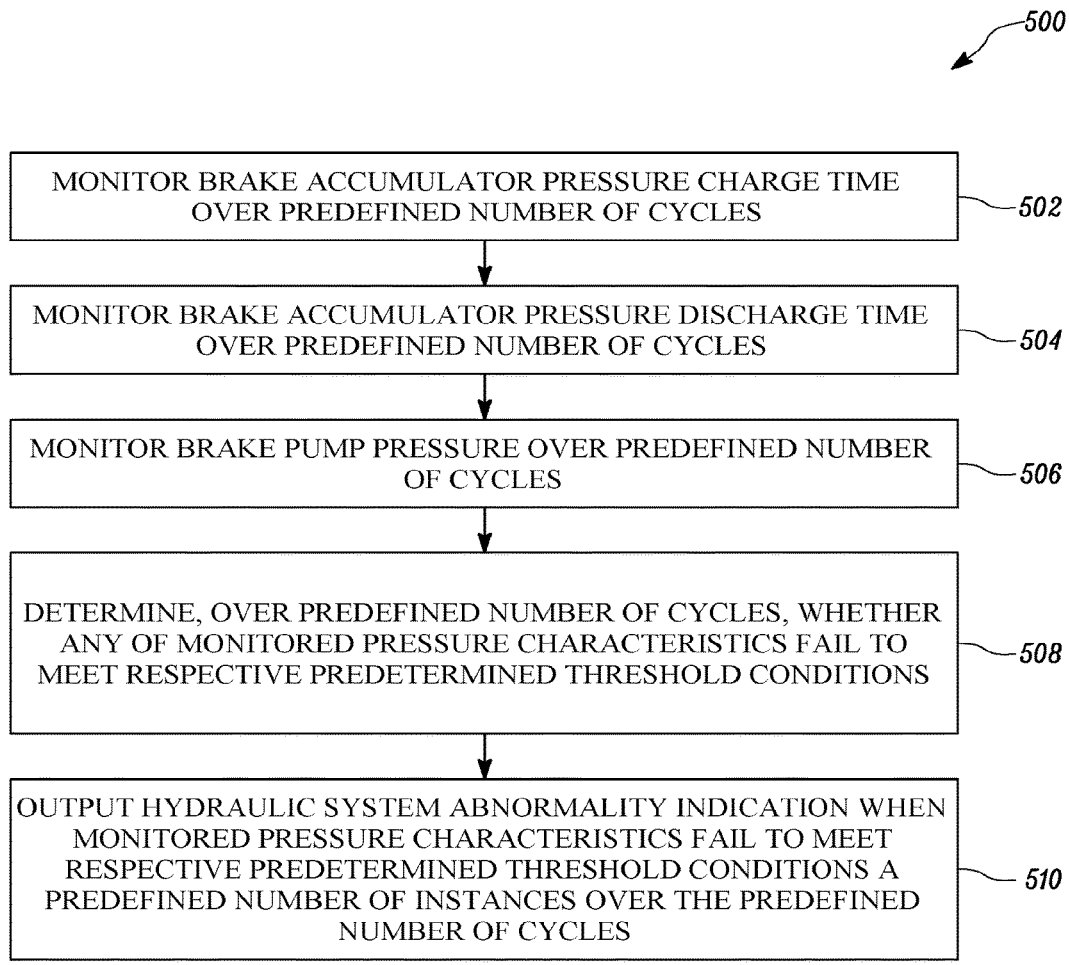
FIG. 5 is a flowchart of a method of determining a malfunction or abnormal condition in a hydraulic system, according to one or more embodiments of the present disclosure.

Further, the present disclosure provides a method, such as the method 500 shown in FIG. 5, of outputting information corresponding to an operational state of a hydraulic system, particularly a malfunction or abnormality state of the hydraulic system. For example, the method may output data indicating that the hydraulic system is malfunctioning, operating below acceptable predetermined criterion, or anticipated to malfunction or operate below acceptable predetermined criterion.

The method 500, in one embodiment, includes at operation 502 monitoring accumulator charge time over a time period. The time period may be an interval corresponding to a time period of a plurality of the actuation cycles, for instance, brake actuation cycles.

The method 500 can further include monitoring accumulator discharge time at operation 504 and monitoring pressure of a pump, such as pump 104, over the time period. In an example, the method 500 can include monitoring pressure characteristics of the pump 104 using the first sensor 112, and monitoring pressure characteristics of the accumulator 108 using the second sensor 114.

The method 500, at 508, can further determine whether any monitored pressure characteristics fail to meet respective predetermined threshold conditions. For example, the controller 116 may determine whether the monitored charge time of the accumulator 108 is within a first predetermined range during the time period, whether the monitored discharge time of the accumulator 108 is within a second predetermined range different from the first predetermined range during the time period, and/or whether the monitored pressure of the pump 104 is within a third predetermined range different from the first and second predetermined ranges during the time period. As noted above, the time period can include a predefined number of charging and discharging cycles of the accumulator 108. Further, the first predetermined range and the second predetermined range may correspond to the predetermined charge time threshold level and the predetermined discharge time threshold level, respectively, described above, and the third predetermined range may correspond to the predetermined pressure threshold level of the pump 104 described above.

When at least one or at least two of above mentioned instances, such as the monitored charge time of the accumulator 108 being outside the first predetermined range during the time period, the monitored discharge time of the accumulator 108 being outside the second predetermined range during the time period, and the monitored pressure of the pump 104 being outside the third predetermined range during the time period, the method 500 can output, at operation 510, a notification, such as a maintenance or operation notification. This notification may be provided to the operator of the machine 100 and/or a maintenance system. In another embodiment, the maintenance notification can be provided when all the predetermined thresholds are not met. In yet another embodiment, the notification can be an output of different specific charging and discharging pressure values of the accumulator 108 and/or pressure values of the hydraulic brake pump 104 for each brake actuation cycle.

In yet another embodiment, outputting the notification can be based on an amount by which one or more of the monitored hydraulic accumulator charge time is outside the first predetermined range during the time period, the monitored hydraulic accumulator discharge time is outside the second predetermined range during the time period, and the monitored hydraulic pump pressure is outside the third predetermined range during the time period. The term 'amount' mentioned herein may be understood as a value by which the respective predetermined thresholds are not met. Further, in another embodiment, the method 500 can include changing a mode of operation of one or more of the accumulator 108 and the pump 104 to an emergency mode when one or more of the respective predetermined thresholds are not met over the time period.

The method 500 may be implemented in any suitable hardware, such that the hardware employed can perform the operations of the method 500 on a real-time basis, for instance. In an example, the controller 116 can perform or be used to perform the operations of the method 500. Further, in some embodiments, computer-readable instructions to perform some or all of the operations of method 500 can be stored on a tangible, non-transitory computer readable storage medium, for example, a magnetic or optical drive, a diskette, semiconductor memory, and any other suitable device. Thus, portions of the operations of the method 500 described herein may be implemented as a computer program product. In an example, the method 500 may be stored in fixed or removable media, and/or stored in memory within a computing device operating according to instructions. As such, the computer-readable instructions, when executed by a computer, can cause the computer to perform the method 500 described herein below.

INDUSTRIAL APPLICABILITY

Embodiments of the disclosed subject matter pertain to hydraulic systems in machines, such as industrial machines, and involve, generally speaking, monitoring pressure characteristics in a hydraulic system over a number of pressure cycles to identify an abnormal or fault condition of the hydraulic system. Such monitoring and identification can be performed automatically, without the need to manually attach a pressure gauge upon take each pressure measurement. Further, more reliable abnormal or fault conditions can be identified because multiple pressure characteristics can be monitored over the number of pressure cycles. An indication corresponding to the detected abnormal or fault condition of the hydraulic system can be output, for instance, to an operator of the machine, to a storage device onboard the machine, and/or a remote maintenance facility.

For the purpose of this disclosure, various operations of the method 500 are described in conjunction with FIG. 1 and FIG. 2 of the present disclosure. Of course, systems or components other than those illustrated in FIG. 1 and FIG. 2 may perform some or all of the operations of the method 500 or variations thereof according to various embodiments of the disclosed subject matter.

At operation 502, the method 500 can monitor and determine brake accumulator pressure charge time over a predefined number of brake actuation cycles. At operation 504, the method 500 can monitor and determine brake accumulator pressure discharge time over the predefined number of brake actuation cycles. At operation 506, the method 500 can monitor brake pump pressure over the predefined number of brake actuation cycles.

In one embodiment, the pressure of the pump 104, and the charge time and the discharge time of the accumulator 108 may be electronically monitored using the first sensor 112 and the second sensor 114, respectively. Further, the predefined number of brake actuation cycles may be defined as discussed above.

At operation 508, the method 500 can determine whether any of the electronically monitored brake accumulator pressure charge times, brake accumulator pressure discharge times, and brake pump pressure over the predefined number of brake actuation cycles fail to meet respective predetermined threshold conditions, over the predefined number of cycles, for instance, brake actuation cycles. The predetermined threshold conditions may include the predetermined charge time threshold level of the accumulator 108, the predetermined discharge time threshold level of the accumulator 108, and the predetermined pressure threshold level of the pump 104, respectively. In an alternate embodiment, the predetermined threshold conditions may be represented as the first predetermined range, the second predetermined range, and the third predetermined range, respectively, as described above.

The method 500 can also determine whether one or more of the respective predetermined threshold conditions is not met a first predetermined number of times over the predefined number of brake actuation cycles. In one example, the one or more of the respective predetermined threshold conditions can include one or more of the respective predetermined threshold conditions. In another example, the one or more of the respective predetermined threshold conditions can include two or more of all of the respective predetermined threshold conditions. Further, the 'first predetermined number of times' can be understood as a first threshold number of times out of the total number of successive occurrences where the predetermined thresholds are not met. At operation 510, the method 500 can output a hydraulic system malfunction or abnormality notification, for instance, to an operator, when one or more of the respective predetermined threshold conditions have not met the first predetermined number of times over the predefined number of brake actuation cycles. This notification may be provided to the operator of the machine 100. In one embodiment, the hydraulic system malfunction or abnormality notification may be electronically outputted by the controller 116 on the interface 120 and/or on the notification panel 236. The hydraulic system malfunction or abnormality notification may be alternatively referred to as the abnormal brake pressure condition maintenance indication and the maintenance notification in the present disclosure.

The method 500 may also include determining whether one or more of the respective predetermined threshold conditions have not been met a second predetermined number of times, greater than the first predetermined number of times, over the predefined number of brake actuation cycles. The 'second predetermined number of times' may be understood as a second threshold number out of the total number of successive occurrences where the predetermined thresholds are not met. Alternatively the 'second predetermined number of times' can be indicative of presence of the abnormal brake pressure condition in the machine 100 and requirement of a remedial action to be performed within or to the machine 100.

Accordingly, based on the determining identifying a malfunction or abnormal pressure condition of the hydraulic system, the method 500 can change a mode of operation of the hydraulic system, such as the third hydraulic system 222, when one or more of the respective predetermined threshold conditions have not been met the second predetermined number of times over the predefined number of brake actuation cycles.

Further, in some embodiments, the method 500 can include determining whether one or more of the respective predetermined threshold conditions is not met the second predetermined number of times, greater than the first predetermined number of times, over the predefined number of brake actuation cycles. Based on the determining, the method 500 can disable a traction hydraulic system, such as the first hydraulic system 218, of the machine 100, or shut down the machine 100.

The method 500 can also include monitoring hydraulic brake accumulator cutout pressure and determining, over the predefined number of brake actuation cycles, whether the monitored hydraulic brake accumulator cutout pressure does not meet one of the respective predetermined threshold conditions. Additionally, the method 500 can include resetting the hydraulic system malfunction or abnormality notification when the one or more of the respective predetermined threshold conditions has met the first predetermined number of times over a subsequent predefined number of cycles, for instance, brake actuation cycles.

Whilst the embodiments of the present disclosure are discussed with respect to hydraulic braking system 102, it will be understood that the embodiments can also be applicable to hydraulic steering, particularly hydraulic steering accumulator pressure charge times and discharge times and hydraulic pump pressure amount. As already described, the systems and methods of the present disclosure can involve monitoring brake accumulator pressure charge and discharge times and brake pump pressure over the number of brake actuation cycles, and identifying whether unsatisfactory brake pressure conditions exist. In other words, systems and methods of the present disclosure can monitor multiple cycles of charge and discharge of the accumulator 108 and determine if the charge time and the discharge time meet respective predetermined thresholds (i.e., within optimum range) to identify whether a maintenance issue exists in the hydraulic braking system 102.

Based on such determination, the controller 116 can output an alert to the operator of the machine 100, and/or output an alert to a remote maintenance system. Additionally or alternatively, the controller 116 can change a mode of operation of the machine 100 to another mode, for example, a "shut down" mode, to compensate for an identified degradation to the hydraulic braking system 102. Thus, rather than looking at individual instances of an out-of-tolerance detection in a single brake actuation cycle, embodiments of the present disclosure can monitor pressure variations in a hydraulic system, such as the third hydraulic system 222, over a predetermined number of cycles, such as brake actuation cycles or brake accumulator charge/discharge cycles. For example, if one cycle indicates one or more monitored hydraulic pressures are out-of-tolerance, such indication may not be sufficient to trigger a maintenance indicator light or an error flag. Rather, two out of five cycles in a predetermined time period or total number of cycles, for instance, may be necessary to constitute an identified malfunction or abnormal condition.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mining truck comprising:
   a first hydraulic system to drive traction wheels of the mining truck;
   a second hydraulic system to operate a steering system of the mining truck; and
   a third hydraulic system to operate braking components of the mining truck, wherein the third hydraulic system includes:
   a hydraulic brake pump;
   a hydraulic brake accumulator in fluid communication with the hydraulic brake pump and the braking components of the mining truck;
   a first sensor to sense pressure characteristics of the hydraulic brake pump;
   a second sensor to sense pressure characteristics of the hydraulic brake accumulator; and
   circuitry electrically coupled to the first sensor and the second sensor, and configured to:
   receive a plurality of signals from the first sensor regarding sensed pressure characteristics of the hydraulic brake pump over a predetermined number of brake actuation cycles, the sensed pressure characteristics of the hydraulic brake pump including information regarding a maximum brake pump pressure for each of the brake actuation cycles,
   receive a plurality of signals from the second sensor regarding sensed pressure characteristics of the hydraulic brake accumulator over the predetermined number of brake actuation cycles, the sensed pressure characteristics of the hydraulic brake accumulator including information regarding a charge time and a discharge time of the hydraulic brake accumulator for each of the brake actuation cycles,
   determine whether the maximum brake pump pressure for each of the brake actuation cycles reaches a predetermined pressure threshold level,
   record any occurrences of maximum brake pump pressure failing to reach the predetermined pressure threshold level over the predetermined number of brake actuation cycles, determine whether the charge time of the hydraulic brake accumulator for each of the brake actuation cycles is at or below a predetermined charge time threshold level, record any occurrences of the charge time of the hydraulic brake accumulator for each of the brake actuation cycles exceeding the predetermined charge time threshold level over the predetermined number of brake actuation cycles, determine whether the discharge time of the hydraulic brake accumulator for each of the brake actuation cycles is at or above a predetermined discharge time threshold level, record any occurrences of the discharge time of the hydraulic brake accumulator for each of the brake actuation cycles failing to reach the predetermined discharge time threshold level over the predetermined number of brake actuation cycles, determine whether an abnormal brake pressure condition exists over the predetermined number of brake actuation cycles based on a total number of recorded occurrences of the maximum brake pump pressure failing to reach the predetermined pressure threshold level, a total number of occurrences of the charge time of the hydraulic brake accumulator exceeding the predetermined charge time threshold level, and a total number of occurrences of the discharge time of the hydraulic brake accumulator failing to reach the predetermined discharge time threshold level, and cause output of an abnormal brake pressure condition maintenance indication responsive the determining indicating that the abnormal brake pressure condition exists.

2. The mining truck of claim 1,
wherein the sensed pressure characteristics of the hydraulic brake accumulator include information regarding hydraulic brake accumulator cutout pressure, and
wherein the circuitry is configured to:
determine whether the hydraulic brake accumulator cutout pressure is out-of-tolerance for each of the brake actuation cycles over the predetermined number of brake actuation cycles,
record any occurrences of the hydraulic brake accumulator cutout pressure being out-of-tolerance over the predetermined number of brake actuation cycles, and
determine whether the abnormal brake pressure condition exists over the predetermined number of brake actuation cycles based on a total number of occurrences of the hydraulic brake accumulator cutout pressure being out-of-tolerance.

3. The mining truck of claim 1, wherein the circuitry is configured to supply a predetermined amount of additional power to at least one of the hydraulic brake accumulator and the hydraulic brake pump to place the third hydraulic system in an emergency hydraulic mode responsive the determining indicating that the abnormal brake pressure condition exists.

4. The mining truck of claim 1, wherein the circuitry is configured to automatically disable the first hydraulic system that drives the traction wheels of the mining truck responsive the determining indicating that the abnormal brake pressure condition exists.

5. The mining truck of claim 1, wherein the predetermined pressure threshold level is 3000 pounds-per-square-inch, the predetermined charge time threshold level is a time value from 8 to 10 seconds, and the predetermined discharge time threshold level is a time value from 25 to 40 seconds.

6. The mining truck of claim 1, wherein the total number of recorded occurrences of the maximum brake pump pressure failing to reach the predetermined pressure threshold level, the total number of occurrences of the charge time of the hydraulic brake accumulator exceeding the predetermined charge time threshold level, or the total number of occurrences of the discharge time of the hydraulic brake accumulator failing to reach the predetermined discharge time threshold level is a total number of successive occurrences.

7. The mining truck of claim 1, wherein the circuitry is configured to cause wireless transmission of the abnormal brake pressure condition maintenance indication to circuitry located remote from the mining truck.

8. A method of notifying an operator of a determined malfunction of a hydraulic braking system of an industrial machine, the method comprising:
monitoring, using circuitry, brake accumulator pressure charge time over a predefined number of brake actuation cycles;
monitoring, using the circuitry, brake accumulator pressure discharge time over the predefined number of brake actuation cycles;
monitoring, using the circuitry, brake pump pressure over the predefined number of brake actuation cycles;
determining, using the circuitry, whether any of the monitored brake accumulator pressure charge times, brake accumulator pressure discharge times, and brake pump pressures over the predefined number of brake actuation cycles fail to meet respective predetermined threshold conditions;
determining, using the circuitry, whether at least one of the respective predetermined threshold conditions fails to be met a first predetermined number of times over the predefined number of brake actuation cycles; and
outputting, using the circuitry, a hydraulic braking system malfunction notification to the operator when at least one of the respective predetermined threshold conditions fails to be met the first predetermined number of times over the predefined number of brake actuation cycles.

9. The method of claim 8, further comprising:
determining, using the circuitry, whether at least one of the respective predetermined threshold conditions fails to be met a second predetermined number of times, greater than the first predetermined number of times, over the predefined number of brake actuation cycles; and
changing, using the circuitry, a mode of operation of the hydraulic braking system when at least one of the respective predetermined threshold conditions fails to be met the second predetermined number of times over the predefined number of brake actuation cycles.

10. The method of claim 8, further comprising:
determining, using the circuitry, whether at least one of the respective predetermined threshold conditions fails to be met a second predetermined number of times, greater than the first predetermined number of times, over the predefined number of brake actuation cycles; and
disabling a traction hydraulic system of the industrial machine or shutting down the industrial machine using the circuitry.

11. The method of claim 8, further comprising electronically monitoring, using the circuitry, hydraulic brake accumulator cutout pressure, wherein said determining includes determining, over the predefined number of brake actuation cycles, whether the electronically monitored hydraulic brake accumulator cutout pressure fails to meet one of the respective predetermined threshold conditions.

12. The method of claim 8, wherein said determining whether at least one of the respective predetermined threshold conditions fails to be met the first predetermined number of times over the predefined number of brake actuation cycles includes at least two of the respective predetermined threshold conditions failing to be met the first predetermined number of times.

13. The method of claim 8, wherein said determining whether at least one of the respective predetermined threshold conditions fails to be met the first predetermined number of times over the predefined number of brake actuation cycles includes all of the respective predetermined threshold conditions failing to be met the first predetermined number of times.

14. The method of claim 8, further comprising resetting, using the circuitry, the hydraulic braking system malfunction notification when the at least one of the respective predetermined threshold conditions has met the first predetermined number of times over a subsequent predefined number of brake actuation cycles.

15. A non-transitory computer-readable storage medium storing computer-readable instructions that, when executed by a computer, cause the computer to perform a method comprising:
monitoring hydraulic accumulator charge time over a time period;
monitoring hydraulic accumulator discharge time over the time period;
monitoring hydraulic pump pressure over the time period;
determining whether the monitored hydraulic accumulator charge time is within a first predetermined range during the time period;
determining whether the monitored hydraulic accumulator discharge time is within a second predetermined range, different from the first predetermined range, during the time period;
determining whether the monitored hydraulic pump pressure is within a third predetermined range, different from the first predetermined range and the second predetermined range, during the time period; and
outputting a maintenance notification responsive to at least two of the monitored hydraulic accumulator charge time being outside the first predetermined range during the time period, the monitored hydraulic accumulator discharge time being outside the second predetermined range during the time period, and the monitored hydraulic pump pressure being outside the third predetermined range during the time period.

16. The non-transitory computer-readable storage medium of claim 15, wherein said outputting the maintenance notification is responsive to all of the monitored hydraulic accumulator charge time being outside the first predetermined range during the time period, the monitored hydraulic accumulator discharge time being outside the second predetermined range during the time period, and the monitored hydraulic pump pressure being outside the third predetermined range during the time period.

17. The non-transitory computer-readable storage medium of claim 15, wherein the time period includes a predefined number of accumulator charge/discharge cycles, the predefined number being two or greater.

18. The non-transitory computer-readable storage medium of claim 17, wherein said at least two of the monitored hydraulic accumulator charge time being outside the first predetermined range during the time period, the monitored hydraulic accumulator discharge time being outside the second predetermined range during the time period, and the monitored hydraulic pump pressure being outside the third predetermined range during the time period to output the maintenance notification are from different accumulator charge/discharge cycles of the time period.

19. The non-transitory computer-readable storage medium of claim 15, wherein said outputting the maintenance notification is based on an amount by which at least one of the monitored hydraulic accumulator charge time is outside the first predetermined range during the time period, the monitored hydraulic accumulator discharge time is outside the second predetermined range during the time period, and the monitored hydraulic pump pressure is outside the third predetermined range during the time period.

20. The non-transitory computer-readable storage medium of claim 15, further comprising changing a mode of operation of a hydraulic accumulator and a hydraulic pump to an emergency mode responsive to said at least two of the monitored hydraulic accumulator charge time being outside the first predetermined range during the time period, the monitored hydraulic accumulator discharge time being outside the second predetermined range during the time period, and the monitored hydraulic pump pressure being outside the third predetermined range during the time period.

* * * * *